(No Model.)  6 Sheets—Sheet 1.

W. J. DAVISSON.
MACHINE FOR MAKING WIRE FABRICS.

No. 289,507.  Patented Dec. 4, 1883.

WITNESSES:
A. C. Bowen.
Q. P. Hood.

INVENTOR:
William J. Davisson,
By H. P. Hood
Atty.

(No Model.) 6 Sheets—Sheet 2.

W. J. DAVISSON.
MACHINE FOR MAKING WIRE FABRICS.

No. 289,507. Patented Dec. 4, 1883.

WITNESSES:
A. C. Bowen
O. P. Hood

INVENTOR:
William J. Davisson
By H. P. Hood
Atty.

(No Model.) 6 Sheets—Sheet 3.
W. J. DAVISSON.
MACHINE FOR MAKING WIRE FABRICS.
No. 289,507. Patented Dec. 4, 1883.
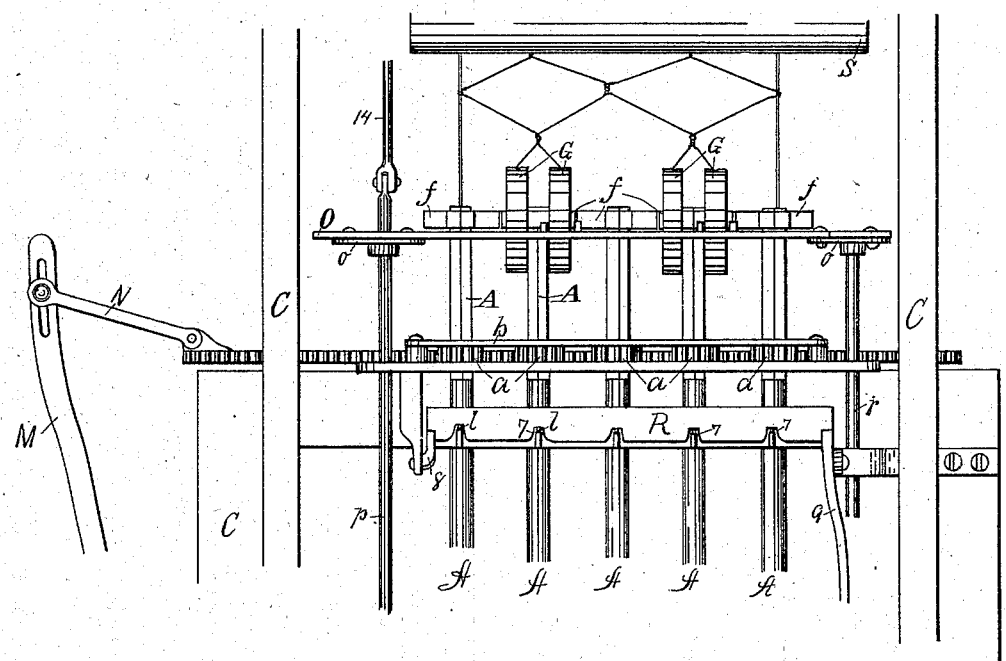
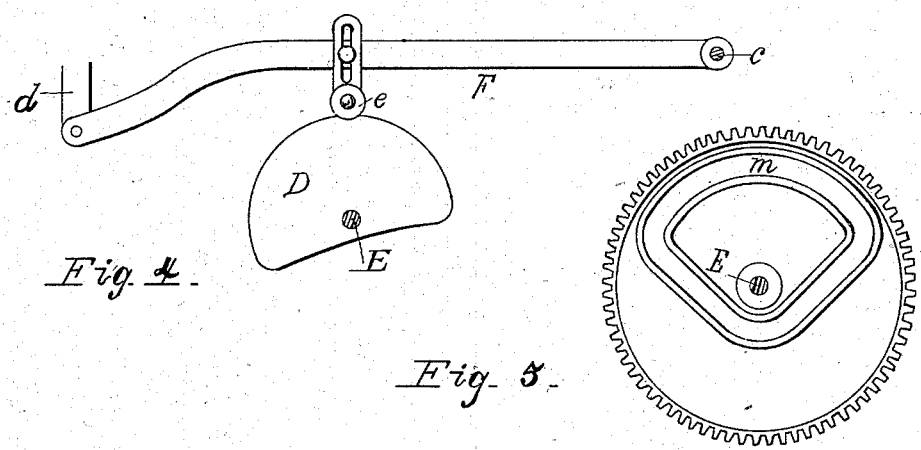
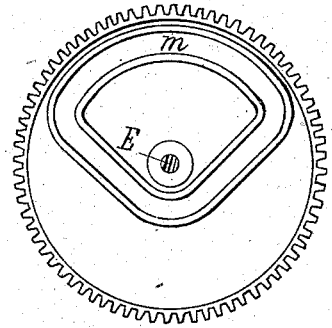
WITNESSES:
A. C. Bowen.
H. P. Hood.
INVENTOR:
William J. Davisson
By H. P. Hood
Atty.

(No Model.) 6 Sheets—Sheet 4.

W. J. DAVISSON.
MACHINE FOR MAKING WIRE FABRICS.

No. 289,507. Patented Dec. 4, 1883.

WITNESSES:
A. C. Bowen.
O. P. Hood.

INVENTOR:
William J. Davisson
By H. P. Hood
Atty.

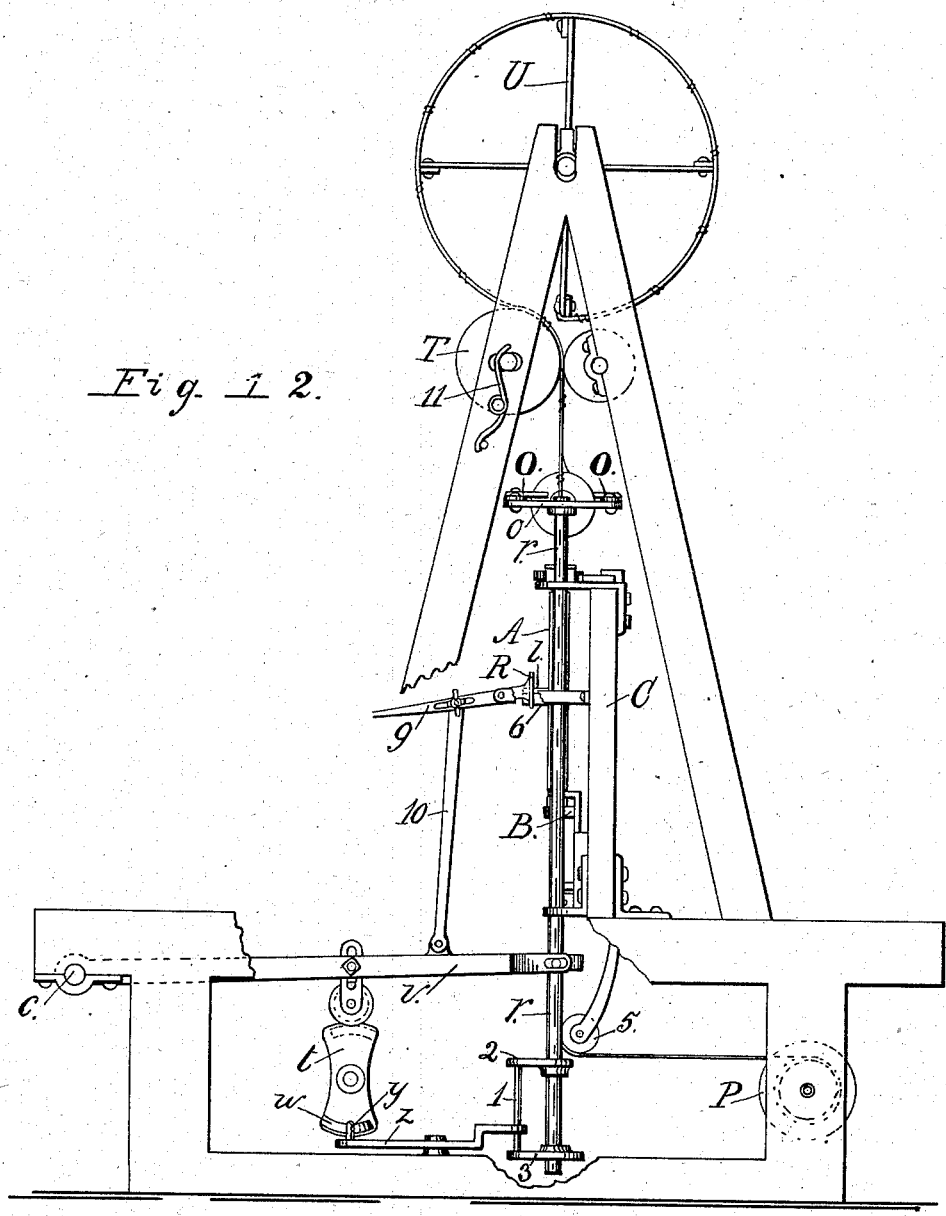

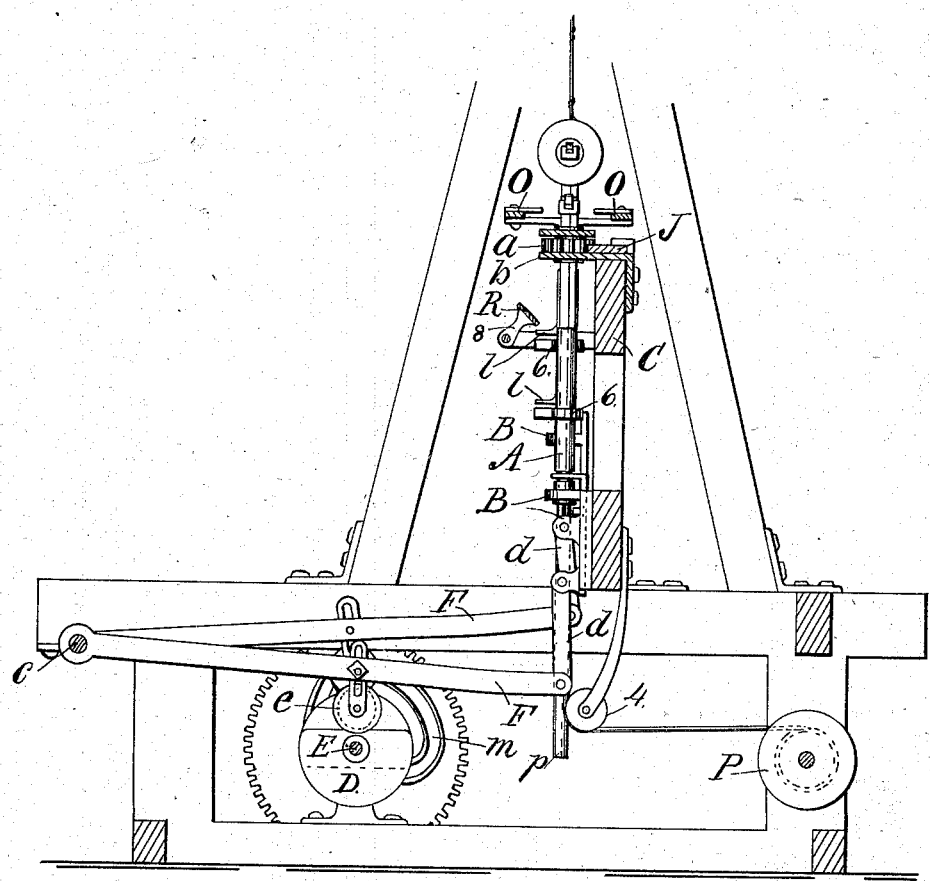

UNITED STATES PATENT OFFICE.

WILLIAM J. DAVISSON, OF FARMLAND, ASSIGNOR OF ONE-HALF TO JONATHAN A. BOTKIN, OF SWAIN'S HILL, INDIANA.

MACHINE FOR MAKING WIRE FABRICS.

SPECIFICATION forming part of Letters Patent No. 289,507, dated December 4, 1883.

Application filed September 8, 1883. (No model.)

*To all whom it may concern:*

Be it known that I, WILLIAM J. DAVISSON, a citizen of the United States, residing at Farmland, in the county of Randolph and State of Indiana, have invented a new and useful Improved Machine for Making Wire Fabrics, of which the following is a specification.

My invention relates to an improved machine for making that class of wire fabric in which a series of light wires are twisted together to form a net-work of diagonal meshes, and about two straight wires forming the edges of the fabric.
The object of my invention is to provide a machine for the purpose mentioned which shall automatically form a continuous wire fabric having on each edge a straight wire, and consisting of meshes formed by twisting together and about said straight wires a series of wires carried on suitable spools or reels, as hereinafter fully described.

Figure 1:
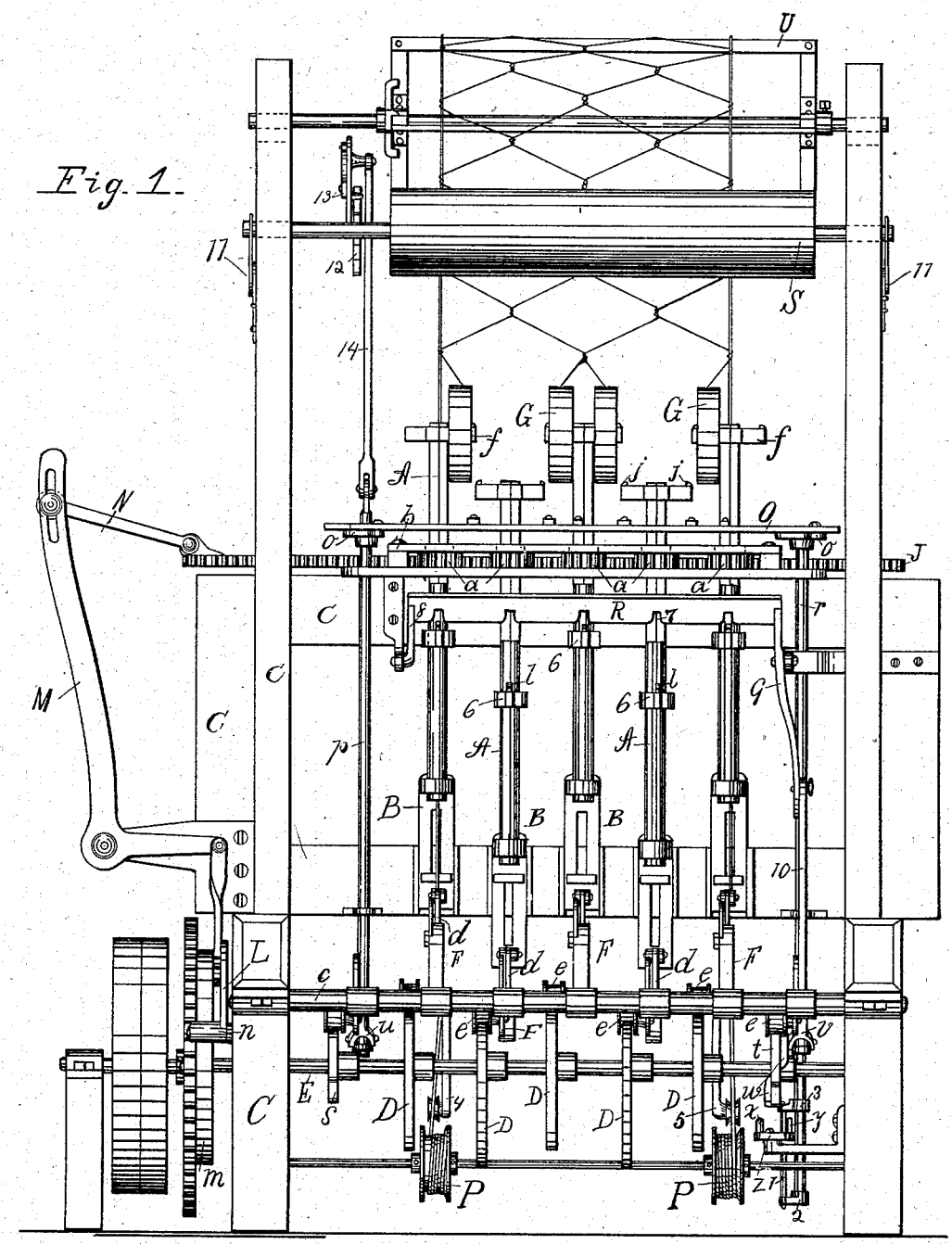
Figure 2:
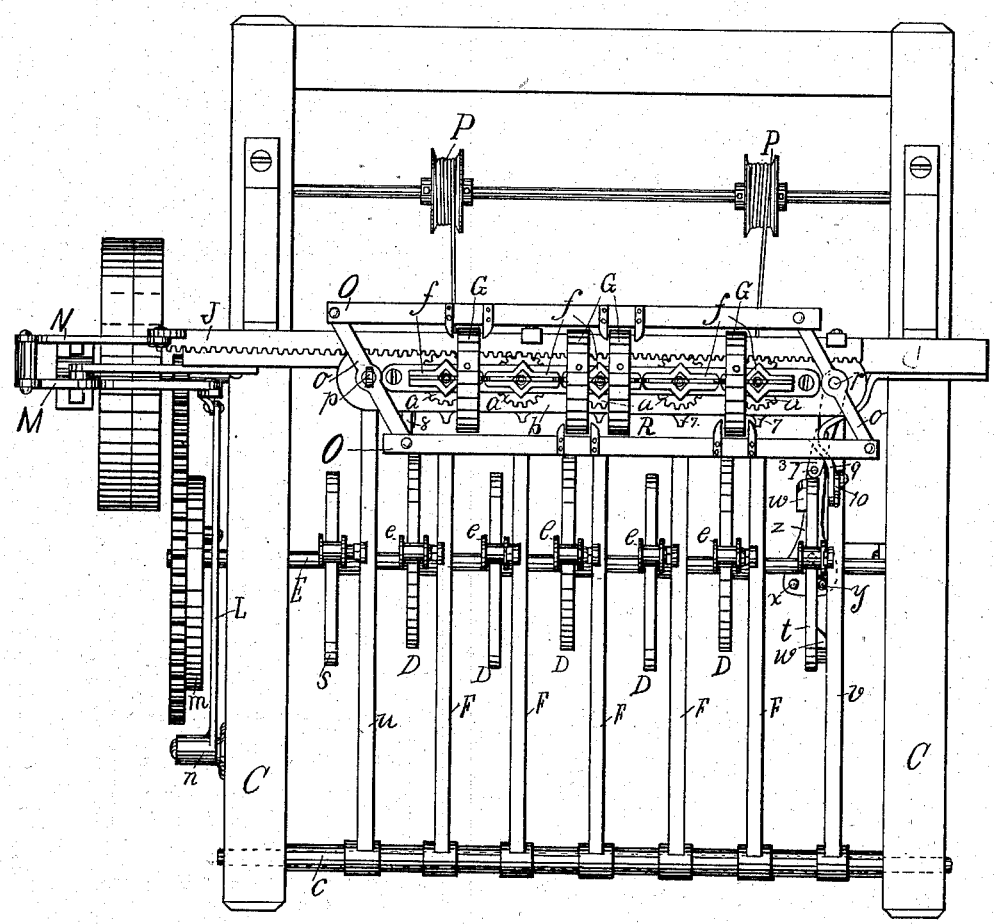
Figure 6:
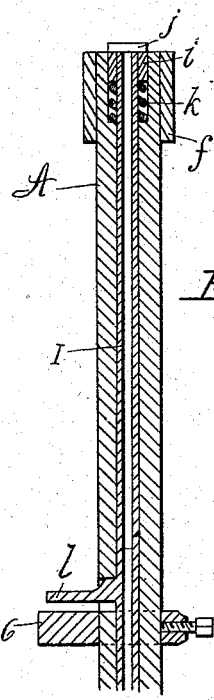
Figure 7:
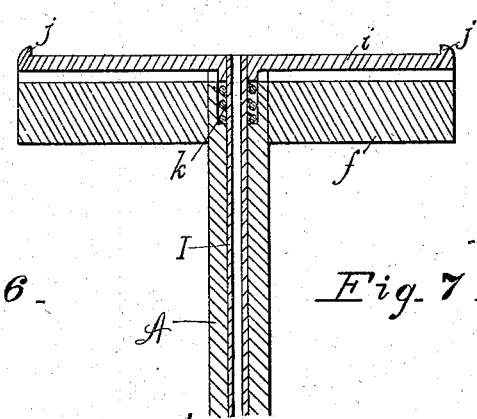
Figure 8:
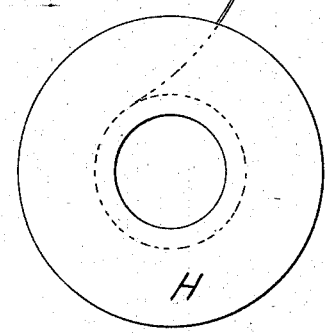
Figure 9:
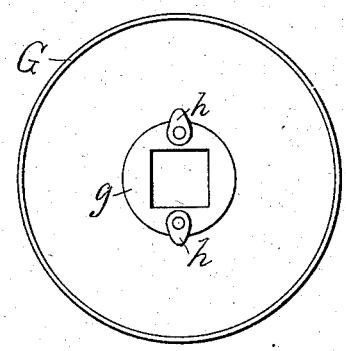
Figure 10:
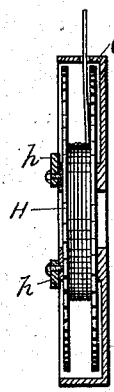
Figure 11:
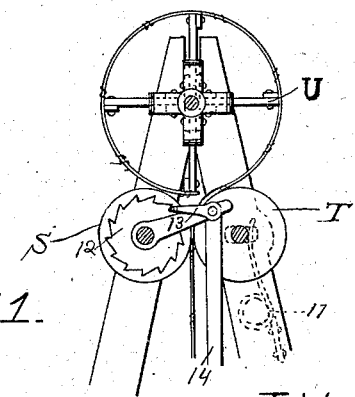

The accompanying drawings illustrate my invention.
Figure 1 is a front elevation of the entire machine, showing the twisting-spindles and wire-reels in the position for forming the meshes. Fig. 2 is a plan of the same. Fig. 3 is a partial front elevation, showing the twisting-spindles in position for shifting the wire-reels from one set of spindles to another. Fig. 4 is a side elevation of one of a series of cams and levers for lifting the twisting-spindles. Fig. 5 is a side elevation of a cam for operating the twisting mechanism. Figs. 6 and 7 are enlarged sectional views of the twisting-spindles. Fig. 8 is a side elevation of one of the wire-reels. Fig. 9 is a side elevation of one of the reel-cases. Fig. 10 is a vertical section of a reel-case and a wire-reel in position thereon. Fig. 11 is an end elevation of the take-up rolls. Fig. 12 is a side elevation of the machine, looking toward the right-hand side of the machine as shown in Fig. 1. Fig. 13 is a vertical section of the machine, taken on a plane at right angles to the power-shaft.

Like letters indicate the same parts in all the figures.

A series of hollow vertical spindles, A A, having their lower ends journaled in vertical sliding bearings B B, are mounted on a suitable main frame, C C. Each of said spindles is provided at its upper end with a cogged pinion, *a*, which is provided with a projecting cylindrical hub having a bearing in a plate, *b*, secured to frame C. Pinions *a* are each provided with a square central perforation, and the upper end of each of the spindles is squared and fitted to slide freely through said perforation, the purpose being to revolve the spindle by means of the pinion, and to allow a vertical movement of the spindle through the pinion. Each spindle A is given an intermittent reciprocating motion by means of a cam, D, mounted on the driving-shaft E, and a lever, F, pivoted at one end to a rod, *c*, extending across from one side of the main frame to the other, and connected at the free end with the sliding bearing B by means of a short link, *d*. A friction-roller, *e*, is adjustably secured to lever F over cam D, there being a cam and a lever for each spindle. Cams D are placed alternately on the driving-shaft, with their flat faces on opposite sides of the shaft and their high portions overlapping, so that at each half-revolution of the driving-shaft each alternate spindle is raised, as seen in Fig. 1; but on account of the overlapping of the high portions of the cams there are two points in each revolution where the spindles are all at their highest point at the same time, for a purpose hereinafter explained. Across the top of each spindle is secured a square cross-bar, *f*.

G G G G are cylindrical cases formed of sheet metal, having a central hub, *g*, which has a square central hole which fits over and is adapted to slide upon the cross-bars *f*. The cases G are open on one side, and each carries within it a reel, H, which is adapted to turn on hub *g*. The wire for forming the meshes of the fabric is wound upon said reels, and they are prevented from slipping off the hub by turn-buttons *h h*, all as clearly shown in Figs. 8, 9, and 10.

For the purpose of preventing the wire-reels and their cases from being thrown off from the ends of cross-bars *f*, a narrow bar, *i*, having upturned ends *j j*, Fig. 6, is placed in a groove in the top edge of cross-bar *f*, said groove being of such depth that the upturned ends of bar *i* may be drawn down flush with the top surface of *f*. Said cross-bar *f* is centrally secured to the upper end of a tube, I, which slides in spindle A. The interior of spindle A is enlarged at the top to receive a spiral spring, *k*, which surrounds tube I and forces the upturned ends of bar *i* above the surface of *f*. A pin, *l*, fastened to the exterior of tube I, projects through a slot in the side of the spindle and stops the upward movement of the tube and the bar *i*.

J is a rack-bar engaging pinions *a a*, and adapted to slide forward and backward endwise, and to revolve said pinions and their respective spindles alternately in opposite directions. Rack-bar J is reciprocated by means of a grooved cam, *m*, on one side of the driving-wheel, (shown clearly in Fig. 5,) a lever, L, pivoted to the main frame at *n*, and having a pin projecting into grooved cam *m*, a bell-crank, M, to the short arm of which the free end of lever L is connected, and a rod, N, pivoted to the end of the rack-bar and adjustably connected to the long arm of lever M.

O O are shipper-bars for shifting the wire-reels from one set of spindles to another. Said bars are pivoted at their ends to cross-heads *o o*, and said cross-heads are rigidly secured at their centers to two upright shafts, *p r*, which shafts are raised twice in each revolution of the driving-shaft by means of cams *s* and *t*, secured on the driving-shaft, and levers *u* and *v*, pivoted at one end to the rod *e*, and connected at the other end with shafts *p* and *r*. Shaft *r*, after being raised, is given a partial revolution by means of cam-shaped projections *w w* on the sides of cam *t*, Fig. 2. Said projections engage alternately pins *x y* on a lever, *z*, the opposite end of which is forked, and engages a rod, 1, secured to shaft *r* by means of two short arms, 2 and 3.

P P are reels carrying the wires for forming the edges of the fabric. 4 5 are guides for said wires.

For the purpose of holding spindles A in position, I secure upon each spindle a dog, 6, and provide a catch-plate, R, which plate is provided with notches 7, adapted to fit over said dogs. Said plate is attached to short arms 8 9, which are pivoted to brackets attached to the main frame. Arm 9 is extended outward beyond its pivot, and is connected with lever *v* by a rod, 10, the effect being, when said lever is raised, to throw plate R downward and engage the dogs on the spindles.

For the purpose of taking up the finished fabric, rolls S T are mounted on shafts journaled in the main frame. The bearings of roll T are movable, and the surfaces of the rolls are held in close contact with the fabric by means of a spring, 11, at each end of roll T. A reel, U, for storing the finished fabric, lies in the slotted bearings on the supports rising from the main frame. One turn of the fabric having been taken about said reel and secured thereto, the reel is thereafter revolved by frictional contact with roll T, on which it rests. Roll S is revolved intermittently by means of a ratchet-wheel, 12, secured to its shaft, a pawl, 13, and a rod, 14, connected to shaft *p*.

The operation of my machine is as follows: The wire from reels P P is carried upward through the outside spindles, A A; or, if a narrower fabric is desired, it may be carried through either of the other spindles, and four of the incased reels carrying wire for forming the meshes are placed on alternate spindles, as shown in Fig. 1. The wire is led from each of these reels through an opening in the case, and all of the wires are passed between take-up rolls S T and passed once around reel H, and there secured. Power is now applied to the driving-shaft E, and as it revolves rack J is thrown forward and the spindles A are revolved, making two complete revolutions, and thereby twisting together the wires on the opposite ends of the cross-bar *f* on the central spindle and passing the wires on the cross-bars of the outside spindles around the straight wires from reels P P. When these revolutions have been accomplished, the intermediate spindles carrying no reels have been raised by their respective cams D and levers F to the level of the spindles carrying the wires, and catch-plate R has engaged dogs 6, at the same time depressing bars *i* by striking pins *l* downward. At the same time the shafts *p r* have been raised by cams *s t* and levers *u v*, carrying upward the shipper-bars O O till they are level with the cross-bars *f*, which are now all in line, and the forks of the shipper-bars embrace between them the reel-cases G. The cam projection *w* on one end of cam *t* now passes between pins *x y*, engaging *y*, and lever *z*, being thereby vibrated and engaging rod 1, partially revolves shaft *r*, by this means moving the shipper-bars O O endwise, and thereby shifting the cases G and their reels to the intermediate cross-bars, *f*, which before carried no reels. The spindles first carrying the reels now fall, and those now carrying the reels are revolved by the return of rack J to its first position and a new series of meshes formed. At each upward movement of the upright shaft *p* pawl 13 engages ratchet-wheel 12, and the finished fabric is drawn upward and wound upon reel U.

When short sections of fabric are to be made—as for gates—straight rods may be substituted for the side wires, and the expansible reel removed.

I claim as my invention—

1. A machine for making wire fabric, consisting of the following elements, namely: a series of spindles arranged in a line and mounted in sliding bearings on a suitable supporting-frame, each spindle being provided with a cross-head centrally secured to one end of said spindle, and adapted to carry reels for wire on opposite sides of the axis of said spindle, reels of wire mounted on said cross-heads, means for raising and lowering said spindles at regular intervals and in alternate order, means for intermittingly revolving said spindles at regular intervals, means for locking the spindles in position when their respective cross-bars are in line vertically and laterally, means for retaining the wire-reels upon their respective cross-bars while said cross-bars are revolving, and means for shifting said wire-reels from one set of cross-bars to another, all combined and co-operating substantially as and for the purpose specified.

2. In a machine for making wire fabric, a series of spindles arranged in a line and mounted in bearings on a suitable supporting-frame, and having on each spindle a cross-head carrying reels for wire on opposite sides of the axis of said spindle, substantially as specified.

3. In a machine for making wire fabric, two or more hollow spindles adapted to admit the passage through their axes of wires forming the edges of the fabric, and having on each spindle a cross-head carrying reels for wire on opposite sides of the axis of said spindle, substantially as specified.

4. In a machine for making wire fabric, the combination, with hollow spindle A, having a cross-head, $f$, adapted to receive reels for wire, of bar $i$, having upturned ends $f\,f$, tube I, spring $k$, and pin $l$, substantially as and for the purpose specified.

5. In a machine for making wire fabric, the combination, with a series of spindles, each having a pinion secured thereon, and a cross-head carrying reels for wire on opposite sides of the axis of said spindles, of a rack-bar arranged to intermesh with said pinions, rod N, secured to said rack-bar, levers M and L, and cam $m$, mounted on the driving-shaft E, whereby said series of spindles are simultaneously revolved at regular intervals during each revolution of said driving-shaft, substantially as specified.

WILLIAM J. DAVISSON.

Witnesses:
   JOHN A. MOORMAN,
   JOSEPH J. PRETLOW.